(12) United States Patent
Lestable

(10) Patent No.: US 7,324,431 B2
(45) Date of Patent: Jan. 29, 2008

(54) METHOD AND DEVICE FOR ALLOCATING A COMMUNICATION SIGNAL TO MULTIPLE CARRIER FREQUENCIES IN A MULTI CARRIER COMMUNICATION SCHEME

(75) Inventor: Thierry Lestable, Paris (FR)

(73) Assignee: Alcatel, Paris (FR)

( * ) Notice: Subject to any disclaimer, the term of this patent is extended or adjusted under 35 U.S.C. 154(b) by 733 days.

(21) Appl. No.: 10/885,591

(22) Filed: Jul. 8, 2004

(65) Prior Publication Data

US 2005/0025113 A1 Feb. 3, 2005

(30) Foreign Application Priority Data

Jul. 28, 2003 (EP) .................................. 03360093

(51) Int. Cl.
*H04J 11/00* (2006.01)
(52) U.S. Cl. .................. 370/203; 370/208; 370/329
(58) Field of Classification Search ................ 370/205, 370/206, 208, 210, 314, 203, 318, 320, 329, 370/330, 334, 343, 312, 328, 465, 482, 483; 375/260, 346, 340, 341, 343, 332, 295, 316; 455/450, 451, 452.1, 509, 553.1
See application file for complete search history.

(56) References Cited

U.S. PATENT DOCUMENTS

| | | | |
|---|---|---|---|
| 6,408,033 B1 | 6/2002 | Chow et al. | |
| 6,876,672 B1* | 4/2005 | Castelain | 370/483 |
| 7,020,226 B1* | 3/2006 | Kirkland | 375/355 |
| 2003/0124994 A1* | 7/2003 | Ylitalo | 455/91 |
| 2003/0125039 A1* | 7/2003 | Lachtar et al. | 455/453 |
| 2004/0062193 A1* | 4/2004 | Ma et al. | 370/208 |

FOREIGN PATENT DOCUMENTS

| | | |
|---|---|---|
| DE | 101 41 971 A1 | 3/2003 |
| EP | 1 083 719 A2 | 3/2001 |

OTHER PUBLICATIONS

Gerhard P. Fettweis et al, "A Time Domain View to Multi-Carrier Spread Spectrum", IEEE 6th International Symposium on Spread-Spectrum Technology and Applications, New Jersey, USA, Sep. 6-8, 2000, pp. 141-144.

(Continued)

*Primary Examiner*—Jean Gelin
(74) *Attorney, Agent, or Firm*—Sughrue Mion, PLLC

(57) ABSTRACT

A method of allocating a communication signal to multiple carrier frequencies in a multi carrier communication scheme is disclosed. The method involves a step of defining a pilot pattern (76), each pilot symbol of the pattern defining a cluster of carrier frequencies. Furthermore, it is estimated (78) which carrier frequencies are appropriate to fulfil a desired quality of service requirement as a function of spreading factors associated with the pilot patterns. A carrier frequency is selected (86, 92) which is appropriate to fulfil the desired quality of service requirement. Further carrier frequencies that are separated from the first selected carrier frequency by the spreading factor (88, 94) are allocated.

8 Claims, 4 Drawing Sheets

OTHER PUBLICATIONS

Fredrik Tufvewsson eet al, "Pilot Assisted Channel Estimation for OFDM in Mobile cellular Systems", Proceedings of IEEE Vehicular Technology Conference, Phoenix, UA, pp. 1639-1643, 1997.

M. A. McKeown et al, "Pilot-assisted channel estimation in MC-CDMA for future mobile cellular systems", Proceedings of the London Communications Symposium, 2002.

H. Atarashi et al, "Broadband packet wireless access based on VSF-OFCDM and MC/DS-CDMA", 13th IEEE International Symposium on Personal Indoor and Mobile Radio Communications. PIMRC 2002. Proceedings (Cat. No. 02TH8637), pp. 992-997, vol. 3, XP010611411.

T. Bruggen et al, "Capacity Improvement in umts by dedicated radio resource management", VTC 2002-Fall. 2002 IEEE 56TH Vehicular Technology Conference Proceedings, Vancouver, Canada, Sep. 24-289, 2002, NY, NY IEEE, vol. 1 of 4 Conf. 56, Sep. 24, 2002, pp. 1284-1288, XP010609024.

* cited by examiner

METHOD AND DEVICE FOR ALLOCATING A COMMUNICATION SIGNAL TO MULTIPLE CARRIER FREQUENCIES IN A MULTI CARRIER COMMUNICATION SCHEME

The invention is based on a priority application EP 03 360 093.3 which is hereby incorporated by reference.

FIELD OF THE INVENTION

The present invention relates to a method and to a device for allocating a communication signal to multiple carrier frequencies in a multi carrier communication scheme, such as an OFDM (orthogonal frequency division multiplex) scheme.

BACKGROUND OF THE INVENTION

In mobile and wireless communication technology, multiple carrier frequency communication schemes gain more and more interest for their ability to cope with intersymbol interference (ISI). In such a system, the bits (or symbols) of a serial data stream are distributed onto a plurality of subchannels associated with different carrier frequencies, thereby reducing the bit rate in each of the subchannels. Due to the reduced bit rate in each subchannel, this communication scheme is less susceptible against intersymbol interference compared to a single carrier communication scheme operating under same or similar delay time constraints.

There are a plurality of publications dealing with multi carrier communication schemes in general, and with OFDM schemes in particular. A general overview of multi carrier systems can be found, for instance, in "A Time Domain View to Multi-Carrier Spread Spectrum" by Fettweis, Nahler, and Kühne, IEEE 6th International Symposium on Spread-Spectrum Technology and Applications, New Jersey, USA, September 2000.

Furthermore, it is known to exploit so-called pilot symbol assisted channel estimation techniques to track channel variations in the communication process. In this connection, so-called pilot symbol assisted modulation (PSAM) might be used for transmitting and receiving a data stream. Pilot symbols are known "training symbols" that are multiplexed into the data stream at certain sub-channels (carrier frequencies) in order to derive the varying channel characteristics from the known characteristics of the training symbols. There are a plurality of publications directed to channel estimation using pilot symbols and, vice versa directed to designing appropriate pilot symbol patterns. Reference is made, for instance, to "Pilot Assisted Channel Estimation for OFDM in Mobile Cellular Systems" by Tufvesson and Masing, Proceedings of IEEE Vehicular Technology Conference, Phoenix, USA, pp. 1639-1643, 1997 and "Pilot-Assisted Channel Estimation in MC-CDMA for Future Mobile Cellular Systems" by McKeown et al., Proceedings of the London Communications Symposium 2002.

So far, however, there has not been made deeper consideration on how to allocate a specific communication signal to selected ones of the multiple carrier frequencies in a multi carrier spread spectrum scenario. It is therefore an object of the present invention to provide a method and a corresponding device for allocating a communication signal to multiple carrier frequencies (sub-channels) in such a communication environment.

SUMMARY OF THE INVENTION

According to one aspect of the invention, this object is achieved by a method comprising the steps of:
a) providing a plurality of carrier frequencies each establishing a communication channel,
b) defining an individual quality of service requirement for transmitting the communication signal,
c) defining a plurality of spreading factors, each spreading factor defining a set of associated carrier frequencies separated from one another by a spreading factor distance,
d) for each spreading factor, defining a pattern of pilot symbols distributed across the plurality of carrier frequencies, each pilot symbol defining a cluster of carrier frequencies,
e) for each spreading factor, estimating which carrier frequencies are appropriate to fulfil the quality of service requirement defined, and
f) allocating a set of carrier frequencies for multi carrier communication of the communication signal, wherein the step of allocating involves a first substep of selecting a first desired carrier frequency from the carrier frequencies estimated as appropriate in step e), and a second substep of selecting further desired carrier frequencies in the remaining clusters, said further desired carrier frequencies being separated from the first desired carrier frequency by the spreading factor distance associated with the selection made in the first substep.

According to another aspect of the invention, this object is further achieved by a device as mentioned at the outset, comprising:
a) a first element for providing a plurality of carrier frequencies each establishing a communication channel,
b) a second element for defining an individual quality of service requirement for transmitting the communication signal,
c) a third element for defining a plurality of spreading factors, each spreading factor defining a set of associated carrier frequencies separated from one another by a spreading factor distance,
d) a fourth element for defining, for each spreading factor, a pattern of pilot symbols distributed across the plurality of carrier frequencies, each pilot symbol defining a cluster of carrier frequencies,
e) a fifth element for estimating, for each spreading factor, which carrier frequencies are appropriate to fulfil the quality of service requirement, and
f) a sixth element for allocating a set of carrier frequencies for multi carrier communication of the communication signal, wherein the step of allocating involves a first substep of selecting a first desired carrier frequency from the carrier frequencies estimated in the fifth element, and a second substep of selecting further desired carrier frequencies in the remaining clusters, said further desired carrier frequencies being separated from the first desired carrier frequency by the spreading factor distance associated with the selection made in the first substep.

The new method and device are a result of applicants research work which has turned out that there is a relationship between quality of service for the communication and the carrier frequencies (sub-channels) selected. In other words, the quality of service, for instance in terms of a bit error rate and/or a transmission capacity, is varying with the specific carrier frequencies selected for transmitting a specific communication signal. According to the invention, it is therefore preferred to design the communication link taking the optimum allocation of carrier frequencies into account.

In practice, there are a plurality of design choices that have to be made in the process of establishing a specific communication link. With the present invention, an approach is suggested which starts with defining a desired quality of service requirement, in particular a desired bit error rate and/or a desired transmission capacity (bit rate). Starting with this goal, it is estimated which carrier frequencies in a multi carrier communication scheme are capable of providing the desired quality of service for the communication. The estimation is carried out for different spreading factor distances between associated carrier frequencies for multi carrier communication. The spreading factor distances, which are actually associated with the coherence bandwidth of each sub-channel, are therefore a second design parameter. Only those carrier frequencies are selected which are capable of meeting the desired quality of service requirement.

The new approach results in a communication signal specific allocation of the available carrier frequencies. Accordingly, the overall system is more efficiently exploited, because communication signals (data streams) requiring a lower bit error rate and allowing for a higher bit error rate, respectively, can each be allocated to appropriate carrier frequencies.

In a refinement of the invention, a step and an element, respectively, for spreading a communication signal by multiplication with a code signal is provided.

Multiplication of the communication signal with a code signal is an easy and efficient approach to achieve the desired distribution of the communication signal across the plurality of carrier frequencies.

In a further refinement, the communication signal is multiplied with a unique code signal for distinguishing the communication signal from other communication signals to be transmitted on the same carrier frequencies.

According to this refinement, the new approach makes advantageous use of CDMA techniques in order to increase the overall transmission capacity and quality.

According to yet another refinement, a carrier frequency associated with the smallest of the spreading factors is selected as the first desired carrier frequency, if it is determined in step e) (and the fifth element, respectively) that appropriate carrier frequencies are available for more than one spreading factor.

This refinement is advantageous, because it additionally takes into account a second design parameter, such as a secondary quality of service requirement. In a preferred embodiment, which is explained in detail later on, a target bit error rate is preferably selected as primary quality of service requirement, while the transmission capacity should also be made as high as possible. The present refinement is perfectly adapted to meet these primary and secondary requirements.

In a further refinement, the quality of service requirement is established in terms of a maximum bit error rate accepted for transmission of the communication signal.

In another refinement, the quality of service requirement is established in terms of a transmission rate desired for transmission of the communication signal.

These two refinements are directed to preferred quality of service requirements which can advantageously be optimized with the new approach.

It goes without saying that the features mentioned above and those yet to be explained below may be used not only in the respectively stated combination, but also in other combinations or on their own, without departing from the scope of the present invention.

BRIEF DESCRIPTION OF THE DRAWINGS

The invention will now be described in more detail with reference to the drawings, in which:

In FIG. 1, a schematic and structural representation of a new device according to the invention is designated by reference number 10 in its entirety.

DETAILED DESCRIPTION OF THE INVENTION

Figure 1:
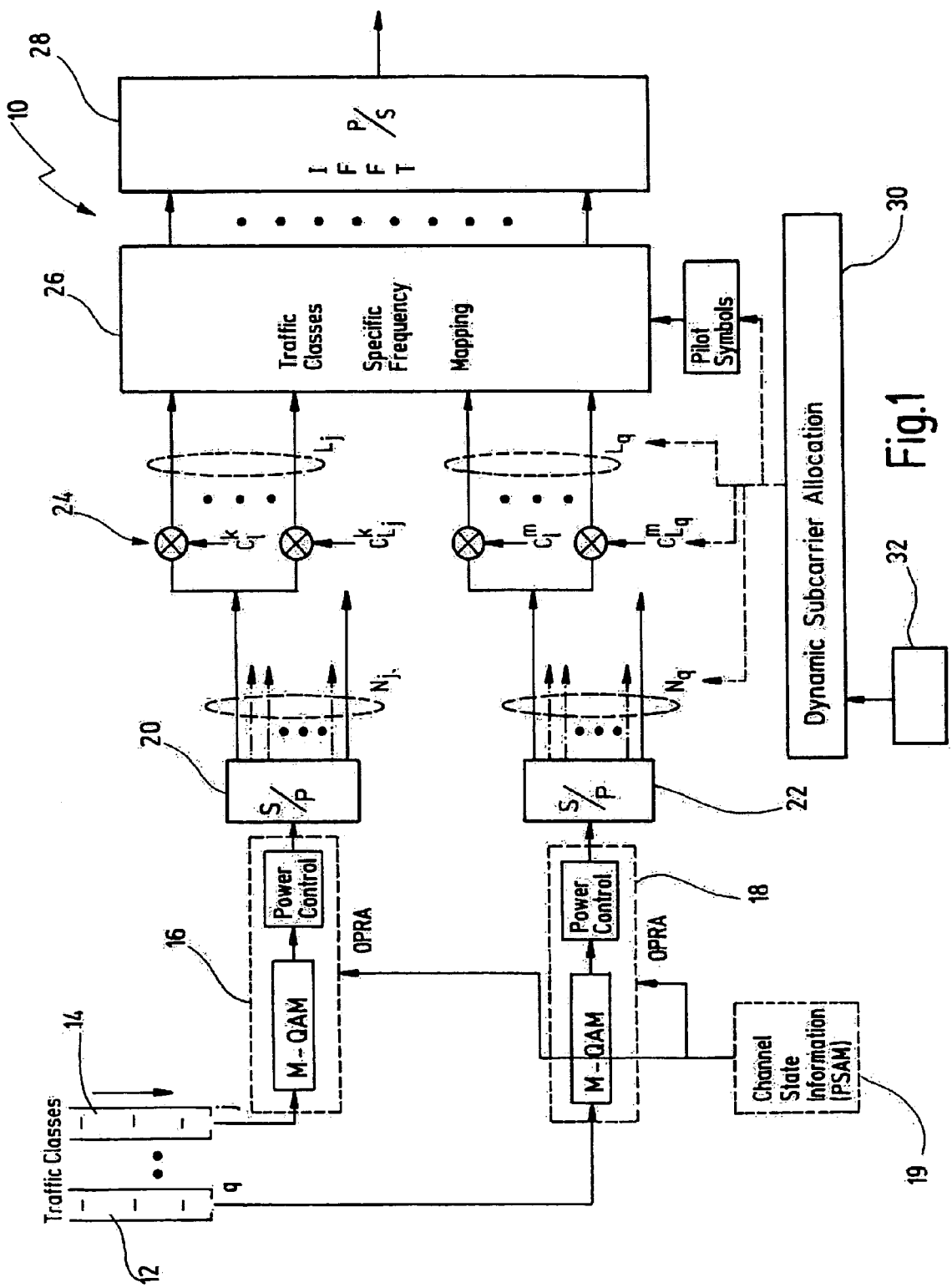
FIG. 1 shows a simplified block diagram of a new device according to the invention.

Device 10 is adapted to receive a plurality of communication signals, two of which are shown here for sake of simplicity and designated by reference numerals 12 and 14. Communication signals 12 and 14 are associated with different traffic classes (distinguished by indices q, i). Each traffic class, such as for instance digitised speech, video data, text data etc., is advantageously transmitted with a specific quality of service requirement, such as a maximum acceptable bit error rate (BER) or a minimum transmission rate. According to the invention, the different quality of service requirements are considered in the process of allocating the communication signals 12, 14 to different carrier frequencies in a multi carrier frequency communication scheme.

Communication signals 12, 14 each are supplied to a modulator 16, 18. It goes without saying that device 10 might comprise a higher number of modulators, but only two have been shown here for sake of simplicity. Modulators 16, 18 are OPRA (optimum power and rate adaptation) modulators capable of adjusting modulation parameters in accordance with actual channel characteristics. Accordingly, modulators 16, 18 are fed with channel state information derived from an estimator 19. In this particular embodiment, the data streams of each communication signal 12, 14 are modulated onto M-QAM constellation, wherein both the constellation order and the transmitted power are selected by means of the channel state information derived from estimator 19. Any known PSAM (pilot symbol assisted modulation) scheme might be used here in this connection.

Each modulated data stream from modulators 16, 18 is supplied to an associated serial-to-parallel converter 20, 22. Serial-to-parallel-converters 20, 22 convert the serial data stream into a parallel data stream, wherein the number of parallel lines is $N_i$ and $N_q$, respectively, here. The numbers $N_i$ and $N_q$ are determined as part of the new approach explained in detail later on.

Each serial-to-parallel converted data stream branch is supplied to a plurality of multiplier stages 24 for being multiplied with an individual chip code. The number of chip code branches is $L_i$ and $L_q$, respectively in the present case. The numbers $L_i$ and $L_q$ are again determined in accordance with the present invention, as will be explained later on. However, it should be noted that the product N·L is equal to the number of carrier frequencies (sub-channels) allocated within this multi carrier communication scheme.

Multiplying each serial-to-parallel converted symbol with the plurality of chip codes results in a spectrum spreading, as it is known from any multi carrier CDMA systems.

The multiplier stages 24 each are connected to a mapping stage 26 which performs a traffic class specific frequency mapping, i.e. a sub-carrier allocation, in accordance with the present invention. Finally, a stage 28 performs an Inverse Fast Fourier Transform (IFFT) and a parallel-to-serial conversion, as it is known to those skilled in the art from conventional multi carrier spread spectrum communication systems.

Reference numeral 30 designates a stage which, in accordance with the present invention, determines the numbers $N_i$, $N_q$, $L_i$, $L_q$, the individual chip codes and the pilot symbol information required to achieve the traffic class specific frequency mapping in stage 26.

A further block designated by reference numeral 32 represents a desired quality of service requirement fed to stage 30 in accordance with the quality of service requirements desired for each traffic class.

Figure 2:
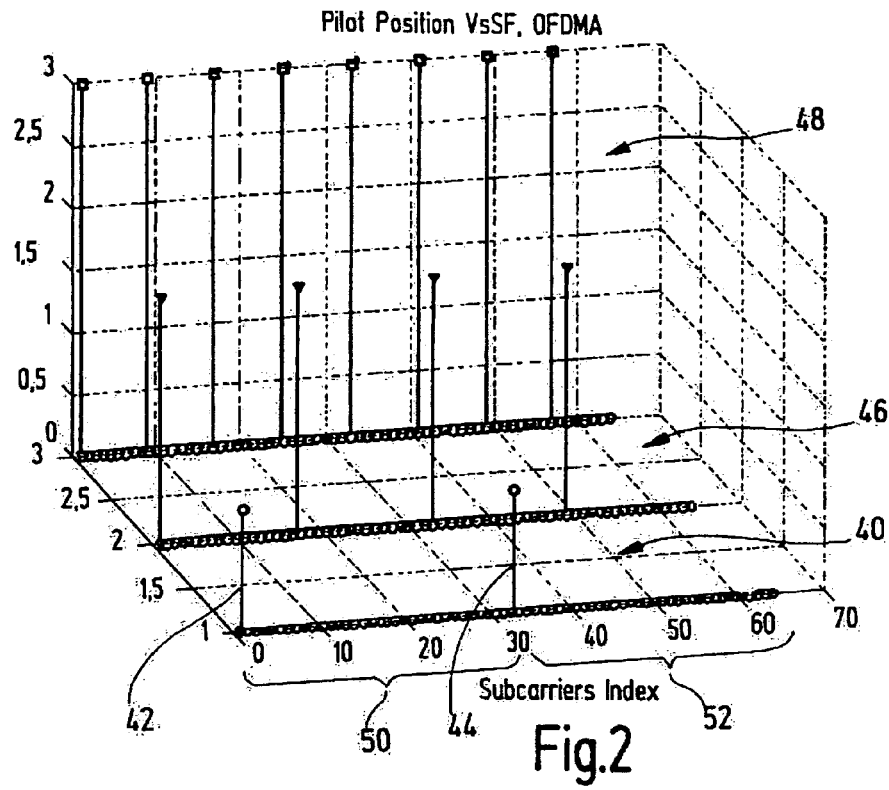
FIG. 2 shows different pilot patterns in a 64 sub-channel environment as a function of spreading factors.

A preferred implementation of the new approach is explained on the basis of a IEEE 802.11a or HiperLAN/2 system having 64 sub-carriers. For such a 64 sub-carrier system, FIG. 2 shows different possible pilot symbol patterns involving different spreading factor distances. Reference numeral 40 designates an example involving two pilot tones evenly distributed among the 64 channels, i.e. each a pilot tone 42, 44 in channels 0 and 32.

Reference numeral 46 designates a pilot pattern involving four evenly distributed pilot tones and reference numeral 48 shows a pilot pattern involving eight evenly distributed pilot tones. Each pilot tone defines a cluster of carrier frequencies, wherein only two clusters 50, 52 associated with pilot tones 42, 44 are designated here for sake of simplicity.

Depending on the sub-carrier position within each cluster, i.e. relatively to its pilot tone reference, there exists some correlation related to the coherency bandwidth of the channel, which is inversely proportional to its multi-path delay spread. For an exponentially decaying power profile, as in the COST 207 channel model, the correlation is:

$$\rho(\Delta f) = \frac{1}{\sqrt{1 + (2\pi \cdot \Delta f \cdot \tau_{rms})^2}}$$

Depending on the correlation and, hence, on the position of the sub-carrier with respect to its associated pilot symbol, the quality of service of the communication in terms of a bit error rate and/or transmission capacity is impacted.

Figure 3:
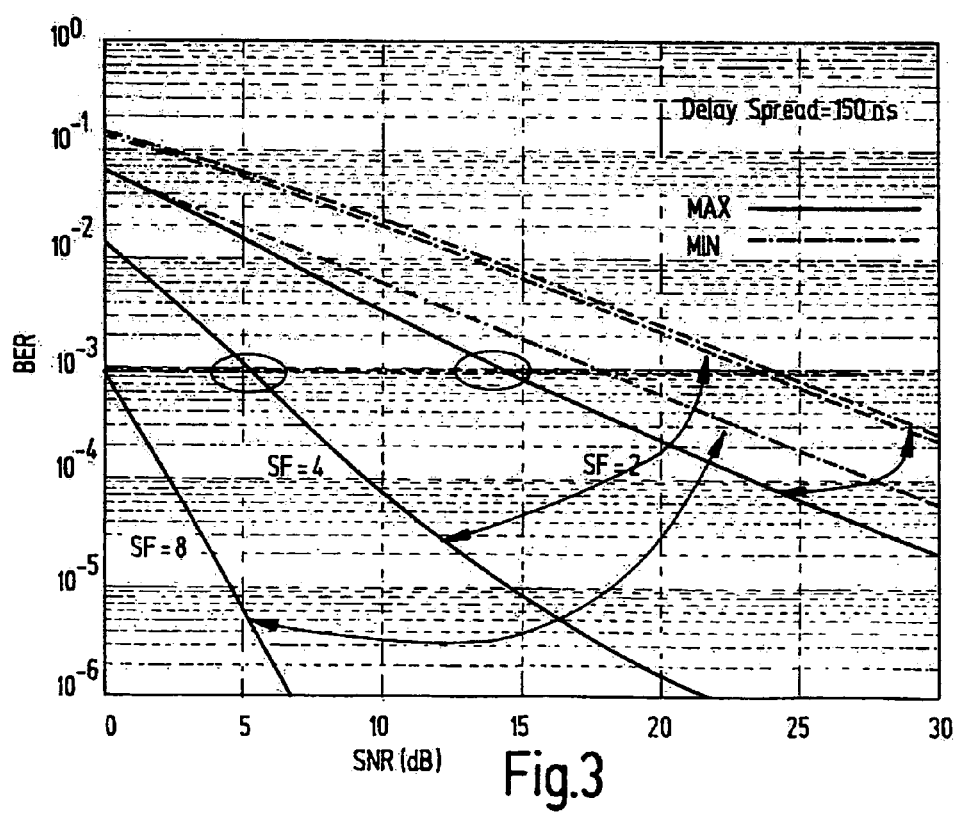
FIG. 3 shows the relationship between a bit error rate (as quality of service requirement) as a function of signal-to-noise-ratio and spreading factor.

FIG. 3 shows a schematic representation of the relationship between bit error rate BER and signal-to-noise ratio SNR as a function of different spreading factors associated with the different pilot patterns shown in FIG. 2. For each spreading factor SF=2, SF=4, and SF=8 corresponding to the use of two, four, and eight pilot symbols, the respective best performance curves (designated as MAX) and the respective worst performance curves (designated as MIN) are shown. As can be seen, there is some cross-over between spreading factor family curves, which allows to select carrier frequencies from different scenarios in order to achieve a desired bit error rate of $10^{-3}$, for instance.

Figure 4:
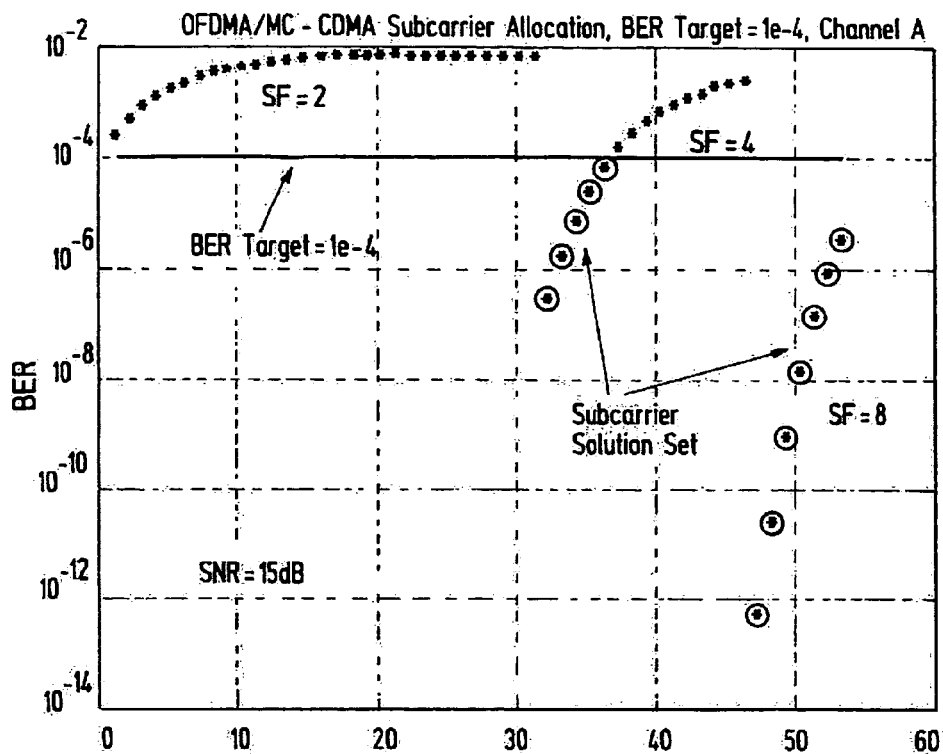
FIG. 4 shows a graphical illustration of estimation results for allocating carrier frequencies.

FIG. 4 shows the estimation results for a given mean SNR per sub-carrier of SNR=15 dB. The desired target bit error rate is $10^{-4}$ in this example. There are shown the estimation results for each sub-carrier of a cluster on the basis of spreading factors F=2, SF=4, and SF=8.

As can be seen, there is no sub-carrier capable of meeting the desired target bit error rate in a scenario using a spreading factor SF=2. For a spreading factor SF=4, there are five sub-carriers capable of providing a bit error rate which is below the target bit error rate of $10^{-4}$. For spreading factor SF=8, all the carrier frequencies are capable of providing a bit error rate below the target bit error rate of $10^{-4}$. Therefore, it is basically possible to choose either a scenario with SF=4 selecting one of the five carrier frequencies or a scenario with SF=8 selecting any desired carrier frequency.

The above estimation results only show the appropriate carrier frequencies for one cluster. However, due to the spreading factor associated with the respective results, the remaining carrier frequencies can easily be determined by selecting those further carrier frequencies from the remaining clusters that hold a corresponding spreading factor distance. In other words, it is suggested to use those carrier frequencies in the remaining clusters that have the same distance to their associated pilot symbols as the carrier frequency in the cluster, where the estimation results are derived from.

According to a preferred embodiment, a second design criterion will also be observed, namely the transmission capacity in the present case. For the scenario shown in FIG. 4, it is therefore preferred to select carrier frequencies associated with spreading factor 4. In other words, in a scenario as shown in FIG. 4, it would be preferred to allocate sub-carriers 1, 2, 3, 4, and 5 for SF=4, and sub-carriers 6, and 7 for SF=8. Accordingly, sub-carriers 1 to 5 would be used in a SF=4 scenario transmitting the data stream in four clusters, and carrier frequencies 6 and 7 would be used in a SF=8 scenario transmitting data symbols in carrier frequencies from eight clusters.

Figure 5:
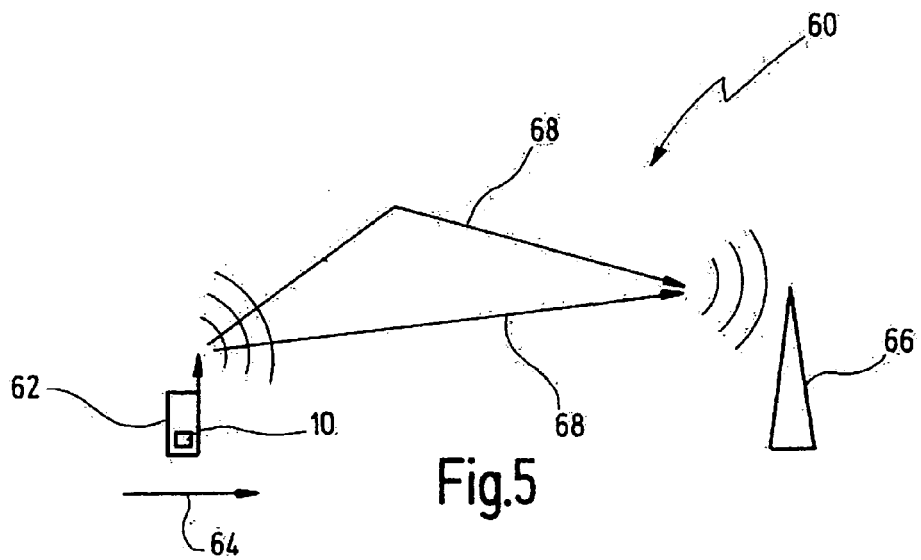
FIG. 5 shows a simplified illustration of a communication system, where the new approach is to be used.

FIG. 5 shows a simplified illustration of a communication system 60, where the new approach of allocating carrier frequencies might advantageously be used. Communication system 60 comprises, for instance, a wireless mobile terminal 62 that is moving along a direction 64. During movement, terminal 62 communicates with a base station 66. As it is known to those skilled in the art, such wireless communication involves a multi-path transmission 68 which causes a delay spread at base station 66. Additionally, the transmission characteristics vary due to movement of mobile terminal 62 and due to other influences, such as reflection characteristics in multi-path transmission 68. In accordance with the present invention, however, wireless terminal 62 comprises device 10 from FIG. 1 in order to allocate carrier frequencies in such a way that the individual quality of service requirements of different communication signals 12, 14 are optimally met.

Figure 6:
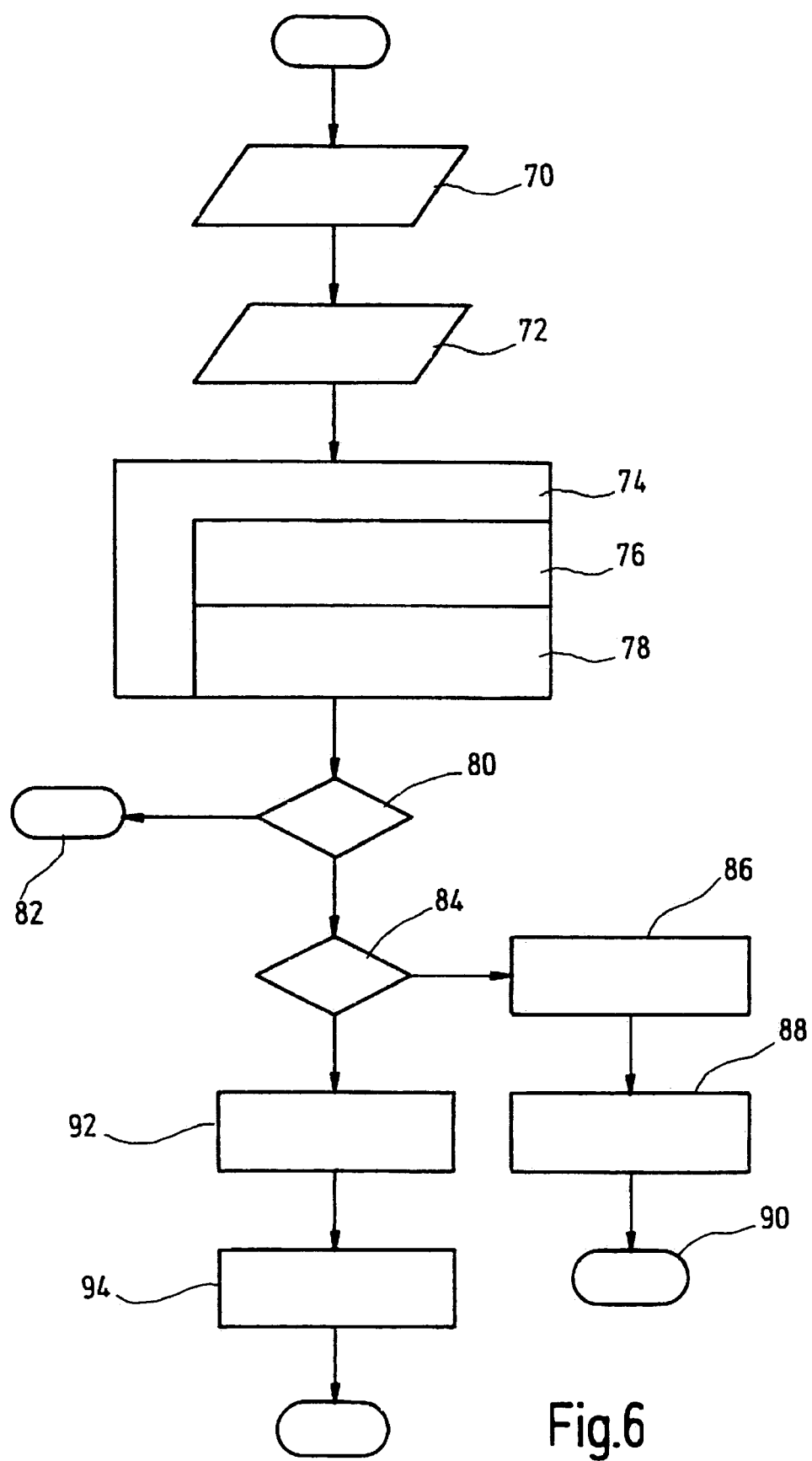
FIG. 6 shows a simplified flow diagram for illustrating the new approach.

FIG. 6 is another illustration of the new approach in terms of a flow diagram. Starting with step 70, a number of carrier frequencies is provided for multi-carrier communication. According to step 72, a desired quality of service requirement is defined, such as, for instance a target bit error rate. However, the quality of service requirement could likewise be a transmission rate in order to achieve a desired transmission capacity.

Step 74 starts a loop which is executed for each defined spreading factor SF. In the scenario according to FIG. 4, the loop is executed for each spreading factor SF=2, SF=4, and SF=8.

In step 76, definition of a pilot symbol patterns associated with spreading factors SF is made, as they are shown in FIG. 2, for instance. However, it should be noted that the pilot patterns shown in FIG. 2 have only been chosen for sake of simplicity. Other pilot patterns might also be envisaged.

In step 78, the quality of service for each spreading factor scenario is estimated as a function of each carrier frequency in a cluster of carrier frequencies. The cluster is determined by the pilot symbol definition from step 76. After execution of step 78 for all spreading factors SF, results are obtained, as they are represented in FIG. 4 for that specific scenario.

Now, step 80 determines whether or not the number of appropriate carrier frequencies is more than one. In other words, it is decided whether or not there is at least one carrier frequency in the cluster that is capable of meeting the desired quality of service requirement. If the answer is negative, the procedure terminates at step 82 indicating that there is no possibility to meet the quality of service requirement under the assumptions made.

If the answer in step 80 is in the affirmative, step 84 determines, if there is exactly one carrier frequency in the cluster that is capable of fulfilling the desired quality of service requirement. If the answer is affirmative, step 86 allocates this specific carrier frequency to the communication signal requiring the quality of service requirement, and step 88 allocates those carrier frequencies from the remaining clusters that correspond to the carrier frequency selected in cluster 1, i.e. those carrier frequencies that hold the spreading factor length for the solution found. The procedure then terminates at the step 90 having an optimum frequency allocation for the given scenario.

If the answer in step 84 is negative, i.e. there are more than one carrier frequencies in cluster 1 capable of fulfilling the quality of service requirement, step 92 selects one of those carrier frequencies that are associated with the smallest spreading factor. Since a smaller spreading factor is associated with a higher spreading factor length (cf. FIG. 2), a higher transmission rate can be used, while the desired target bit error rate is still met.

Step 94 then selects corresponding carrier frequencies, as has been explained with reference to step 88.

The invention claimed is:

1. A method of allocating a communication signal to multiple carrier frequencies in a multi carrier communication scheme, such as an OFDM scheme, the method comprising the steps of:
   a) providing a plurality of carrier frequencies each establishing a communication channel,
   b) defining an individual quality of service requirement for transmitting the communication signal,
   c) defining (74) a plurality of spreading factors, each spreading factor defining a set of associated carrier frequencies separated from one another by a spreading factor distance,
   d) for each spreading factor, defining a pattern of pilot symbols distributed across the plurality of carrier frequencies, each pilot symbol defining a cluster of carrier frequencies,
   e) for each spreading factor, estimating which carrier frequencies are appropriate to fulfill the quality of service requirement defined, and
   f) allocating a set of carrier frequencies for multi carrier communication of the communication signal, wherein the step of allocating involves a first substep of selecting a first desired carrier frequency from the carrier frequencies estimated as appropriate in step e), and a second substep of selecting further carrier frequencies in the remaining clusters, said further desired carrier frequencies being separated from the first carrier frequency by the spreading factor distance associated with the selection made in the first substep.

2. The method of claim 1, further comprising a step of spreading the communication signal by multiplication with a code signal.

3. The method of claim 2, wherein the communication signal is multiplied with a unique code signal for distinguishing the communication signal from other communication signals to be transmitted on the same carrier frequencies.

4. The method of claim 1, wherein, if it is determined in step e) that appropriate carrier frequencies are available for more than one spreading factor, a carrier frequency associated with the smallest of the spreading factors is selected as the first desired carrier frequency.

5. The method of claim 1, wherein the quality of service requirement is established in terms of a maximum bit error rate accepted for transmission of the communication signal.

6. The method of claim 1, wherein the quality of service requirement is established in terms of a transmission rate desired for transmission of the communication signal.

7. A device for allocating a communication signal to multiple carrier frequencies in a multi carrier communication scheme, such as an OFDM scheme, the device comprising:
   a) a first element for providing a plurality of carrier frequencies each establishing a communication channel,
   b) a second element for defining an individual quality of service requirement for transmitting the communication signal,
   c) a third element for defining a plurality of spreading factors, each spreading factor defining a set of associated carrier frequencies separated from one another by a spreading factor distance,
   d) a fourth element for defining, for each spreading factor, a pattern of pilot symbols distributed across the plurality of carrier frequencies, each pilot symbol defining a cluster of carrier frequencies,
   e) a fifth element for estimating, for each spreading factor, which carrier frequencies are appropriate to fulfill the quality of service requirement, and
   f) a sixth element for allocating a set of carrier frequencies for multi carrier communication of the communication signal, wherein the step of allocating involves a first substep of selecting a first desired carrier frequency from the carrier frequencies estimated as appropriate in the fifth element, and a second substep of selecting further desired carrier frequencies in the remaining clusters, said further desired carrier frequencies being separated from the first desired carrier frequency by the spreading factor distance associated with the selection made in the first substep.

8. A communication system for communicating a communication signal from a transmitter to a receiver, wherein at least one of the transmitter and the receiver comprises a device as defined in claim 7.

* * * * *